Aug. 18, 1953  J. J. KIRBY ET AL  2,649,214
AUTOMATIC GLASS BULB FEED
Filed April 3, 1952  3 Sheets-Sheet 3
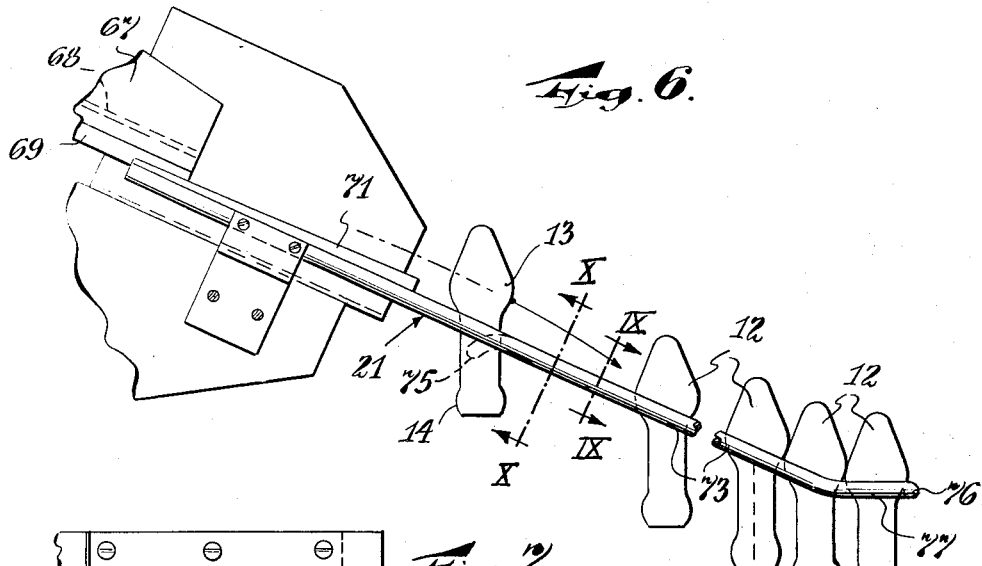
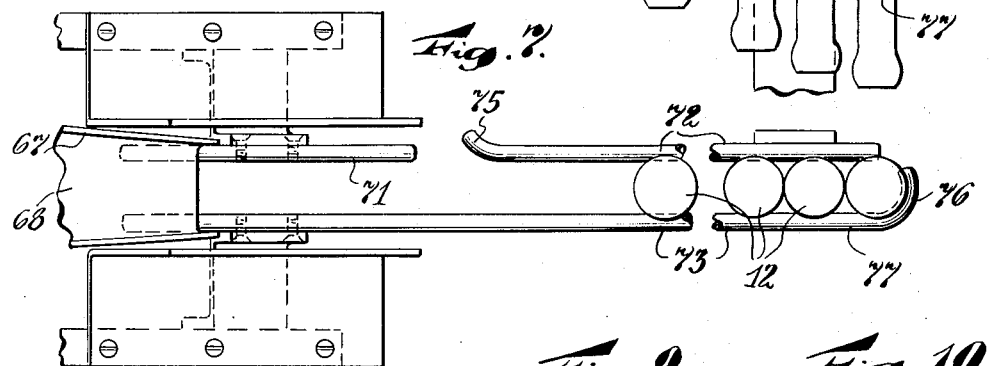
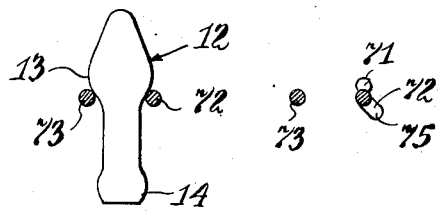
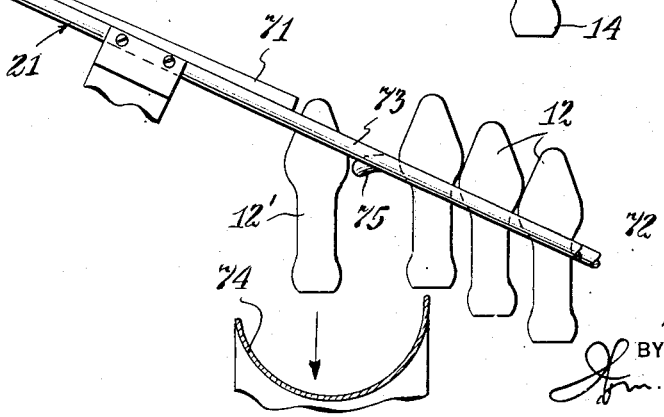
INVENTORS
J. J. KIRBY
M. E. McGOWAN
BY
ATTORNEY Patented Aug. 18, 1953

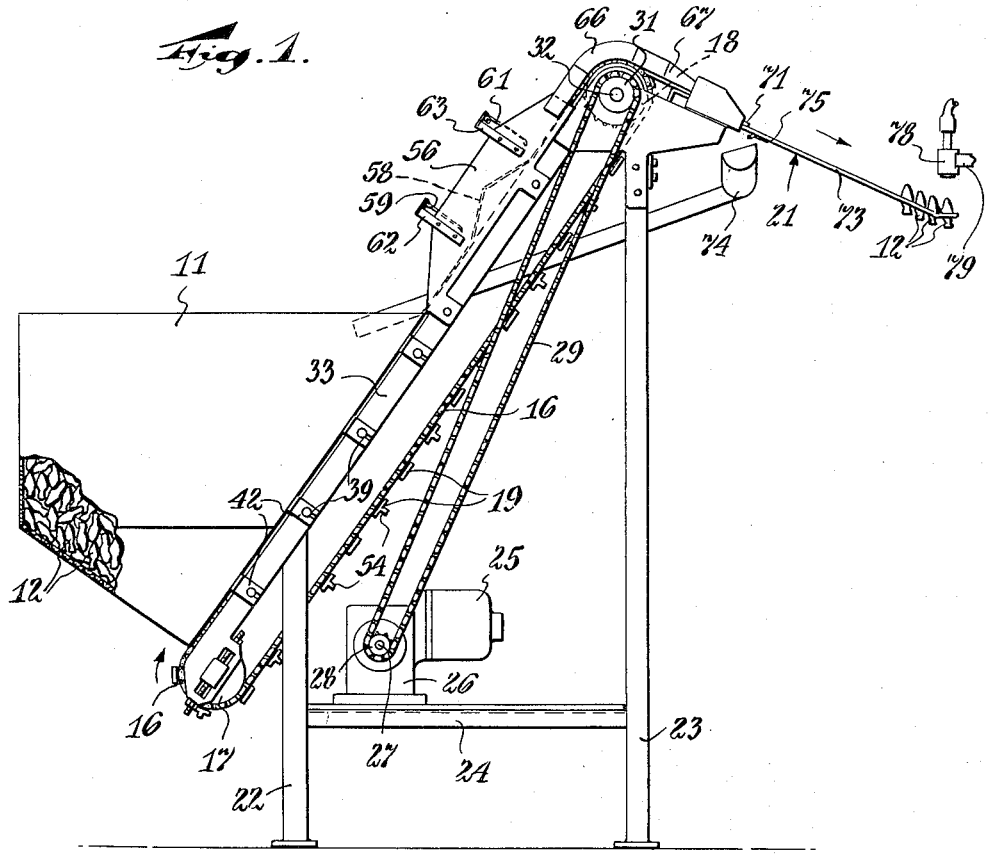
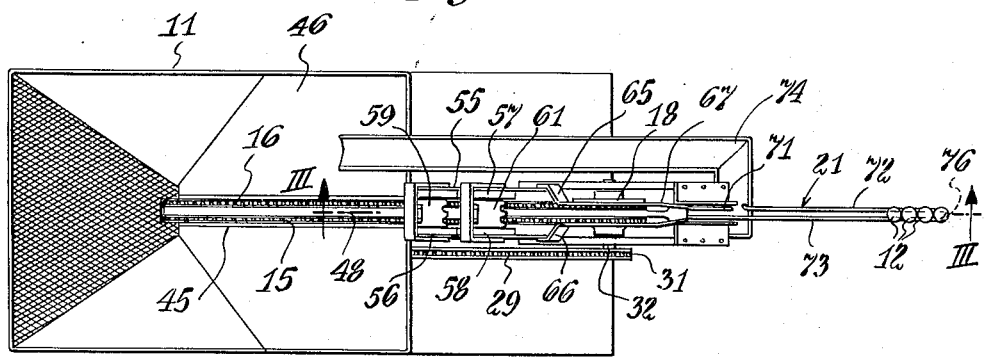

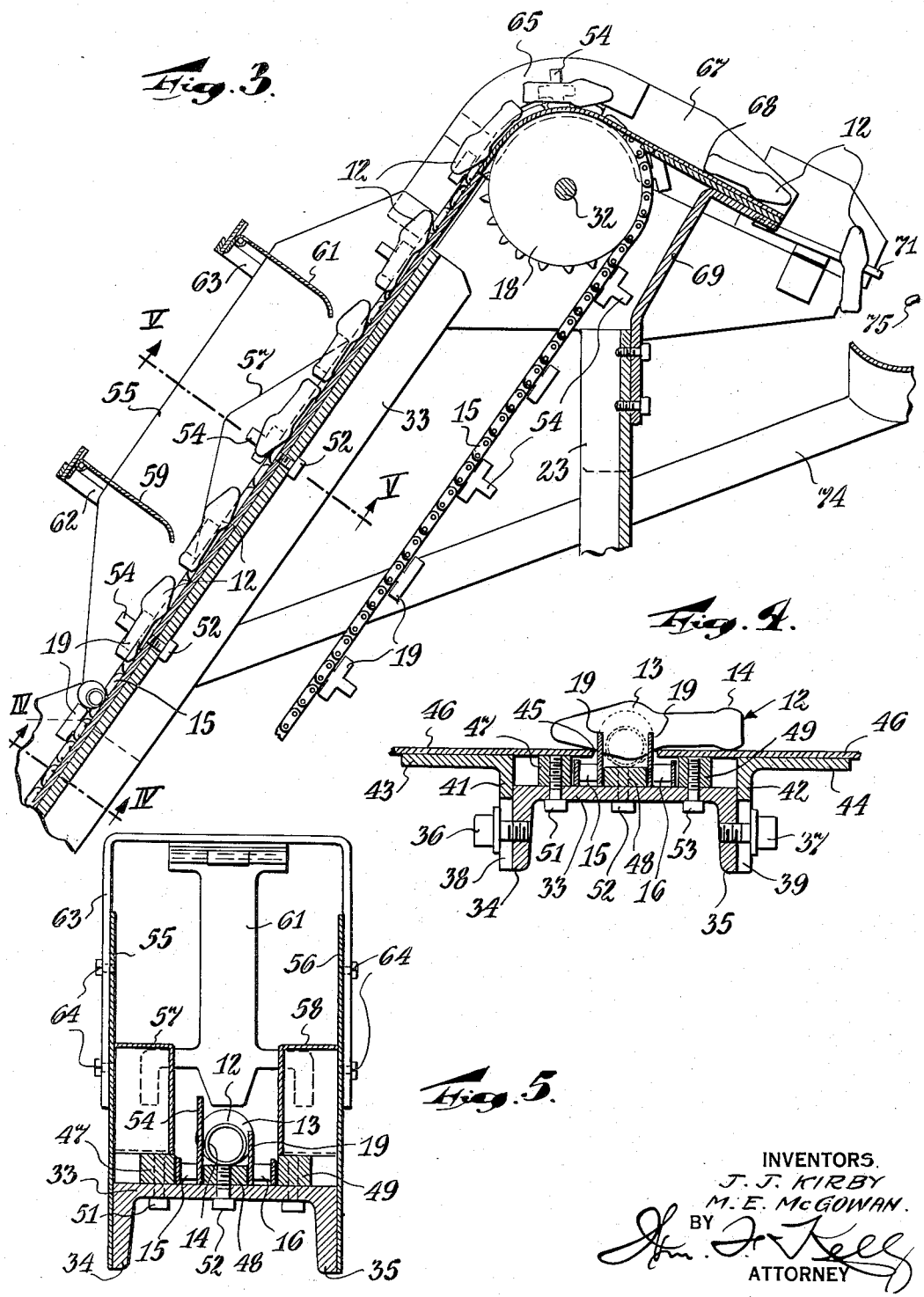

2,649,214

UNITED STATES PATENT OFFICE 2,649,214

AUTOMATIC GLASS BULB FEED

Joseph J. Kirby, North Arlington, and Michael E. McGowan, Bloomfield, N. J., assignors to Westinghouse Electric Corporation, East Pittsburgh, Pa., a corporation of Pennsylvania Application April 3, 1952, Serial No. 280,334

10 Claims. (Cl. 214—8)

This invention relates to a machine for feeding open flared-neck lamp bulbs to a gravity track for transfer to a sealing machine.

The principal object of our invention, generally considered, is to orient the axes of and feed open flared-neck lamp bulbs, of the type in which the maximum bulb diameter is greater than the maximum diameter at the neck or cullet, and in which there is more weight toward the cullet end from the bulb section of maximum diameter, than toward the tip or closed end of the bulb, to a gravity track from where said bulbs may be transported to a sealing machine.

Another object of our invention is to provide a machine comprising conveyor wheels, such as sprocket wheels, for example, over which travel lug-carrying bulb-transporting means, such as chains, spaced less than the diameter of the bulb, for transporting such bulbs from a hopper to the top of a chute inclined sufficiently to cause the bulbs to slide to position for transfer to a sealing machine, a gap or break being provided in the chute to allow excess bulbs to return to the hopper.

A further object of our invention is to provide a bulb conveyor with ramps on either side of the bulb runway to disengage bulbs positioned crosswise of the conveyor chains, to effect the desired axial orientation of said bulbs.

A still further object of our invention is to provide slots in the flanges of the bulb-holding hopper, on opposite sides of a slit in the hopper sidewall through which the sprocket chain lugs pass, for adjustably receiving bolts which connect the conveyor chains-supporting channel thereto.

An additional object of our invention is to provide gravity feed rails from the top of the chain conveyor to the point at which bulbs are to be swung to the sealing machine, comprising chrome-plated rods, the rod at one side being formed as two sections, the top section being at a somewhat smaller incline than the corresponding portion of the other rod, so as to assist bulbs in motion to jump the gap between said sections, the space between said sections being such that when a bulb is stopped it will slide therebetween and be returned to the hopper via a gravity chute.

Another object of our invention is to provide a conveyor, as above described, in which the gravity feed rails are spaced a sufficient distance for the neck or cullet section of the bulb, but not enough for the bulb section to pass therebetween, whereby said bulbs are delivered closed end up to position for engagement by a vacuum pick-up and swinging arm, or other device, for unloading and feeding to a sealing machine.

Other objects and advantages of our invention will become apparent as the description proceeds.

Referring to the drawing, in which like parts are designated by like reference characters:

Figure 1 is an elevational view, with a part broken away, of a conveyor embodying our invention.

Figure 2 is a plan of the conveyor shown in Figure 1.

Figure 3 is a vertical sectional enlarged view of the conveyor, on a line III—III of Figure 2, in the direction of the arrows.

Figures 4 and 5 are sectional views, on the correspondingly numbered lines of Figure 3, in the direction of the arrows.

Figure 6 is an enlarged fragmentary elevational view of the extreme right hand portion of the machine, as shown in Figure 1.

Figure 7 is a fragmentary plan of that portion of the machine shown in Figure 6.

Figure 8 is a view corresponding to a portion of Figure 6, but showing one of the bulbs in the process of dropping from the gravity feed rails to the return chute.

Figures 9 and 10 are sectional views, on the correspondingly numbered lines of Figure 6, in the directions of the arrows.

The machine, to be now described in detail, in the present embodiment consists generally of a hopper 11, desirably formed of sheet metal, into which bulbs 12 are loaded. The bulbs handled by this machine are the type in which the maximum diameter of the closed portion 13 of the bulb is greater than the maximum diameter at the flared open neck portion 14. The bulbs are transferred upward, desirably at an angle of approximately 55½°, by continuous flexible conveyor means, such as two sprocket chains 15 and 16, for example, which are set parallel to each other and pass over the lower conveyor wheel means, such as sprocket wheels 17, for example, and the upper conveyor wheel means, such as sprocket wheels 18, for example, mounted on axles for rotation. On this conveyor are mounted a series of bulb-engaging and carrying means, such as steel lugs 19, for example, which engage and carry upward the bulbs, discharging them at the top of the upper sprocket wheels 18 into a gravity feed chute 21.

The hopper, sprocket wheels, chains and other parts to be subsequently described, are supported from the floor by posts 22 and 23 between which extends a frame member 24 supporting the drive motor 25 and reduction gear in box 26. From the reduction gear box projects a shaft 27 carrying a sprocket wheel 28, over which passes a sprocket chain 29 driving a sprocket wheel 31 on the shaft 32 carrying the sprocket wheels 18. The upper sections of the chains 15 and 16 are slidably carried on a channel iron 33, the flanges of which depend as indicated at 34 and 35 and carry bolts 36 and 37 received in corresponding slots 38 and 39 in depending flanges 41 and 42 of frame portions 43 and 44 of the hopper 11.

Thus said channel member 33 is adjustably positioned so that the bulb engaging and carrying means, or lugs 19 of the chains, pass between plate or wall portions, defining a part of the bulb-supplying device or out of a space or slot 45 formed in the side sheet 46 of the hopper, lying in a vertical plane, and between which plate portions bulbs are moved. Sufficient clearance for the purpose is provided between the web of the channel member 33 and the inner surface of the side sheet 46. The chains 15 and 16 are guided in grooves formed between track members 47, 48 and 49 secured to said web member, as by bolts 51, 52 and 53. The track members also serve as stops for limiting movement of the channel toward the side sheet 46. Certain of the lugs 19, which are here designated 54, are longer or taller than the other lugs in order to effect some agitation of the bulbs in the hopper to facilitate feeding them to the conveyor chains.

The channel 33 extends diagonally upward and carries side plates 55 and 56 beyond the hopper 11. In order to effect the desired axial orientation of the bulbs 12 on the conveyor chains, we provide ramps 57 and 58 disposed between said plates and spaced at the proper distance to engage the ends of a bulb, if caught sideways as viewed in Figure 4, and lift said bulb out of engagement with the lugs 19 and 54 so that it will either roll back into the hopper or turn to a desired realignment. To prevent bulbs from being carried along in other than the prone positions illustrated in Figure 3, we provide gate members 59 and 61 which are swingable upward from the extreme lower positions illustrated in Figure 3. They are pivoted to inverted U-shaped brace members 62 and 63, respectively, the depending arms of which are secured, as by tap bolts 64, to the side plates 55 and 56.

These side plates 55 and 56 flare to maximum depth between the brace members 62 and 63, and then decline in depth to their upper ends where they are connected to side plates 65 and 66 which curve around the upper sprocket wheels 18 and terminate in a funnel portion 67. The floor portion 68 of the funnel portion 67 is connected to the upper end of the post 23 by angular bracket 69, and discharges directly as it narrows, as indicated in Figure 7, to a gravity track or chute formed by continuous and interrupted rails, desirably inclined at an angle of about 27°. These rails here consist of rods 71, 72 and 73, desirably chrome plated and circular in section. The lateral spacing between the rod 73 on one side and the rods 71 and 72 on the other, is such that the cullet or neck portions of the bulbs drop therebetween while said bulbs are engaged slightly below their sections of maximum diameter.

The rods 71 and 72, as shown most clearly in Figures 6, 7 and 8, are spaced a distance from one another sufficient to allow a stationary bulb 12, when in upright position shown in Figure 6, to pass therebetween to a trough chute 74 which returns it to the hopper 11 by gravity. The inclination of the gravity rod chute, however, and the difference in slope between the rods 71 and 73, as viewed in Figures 6 and 8, is such that bulbs while in motion will jump the gap between the rods 71 and 72, and only drop into the chute 74 after being stopped, as because bulbs have accumulated between the rods 72 and 73 so as to reach the top of the rod 72.

The rod 72 desirably terminates in a downwardly and outwardly bent portion 75 which insures that when the chute is full, to the condition illustrated in Figure 8, an excess bulb 12' slides from the inclined portion 75 and between it and the lower end of the rod 71 into the chute 74 therebeneath. The lower end of the rod 73 is curved, as indicated at 76, and disposed horizontal as indicated at 77, so as to provide a terminal rest from which a bulb may be picked, as a means of the vacuum device 78 on the end of a transfer arm 79 for removal to a sealing machine.

*Operation*

The hopper 11 is provided with a supply of bulbs 12 of the character specified. The motor 25 is placed in operation, causing rotation of the sprocket wheels 18 and upward movement of the upper sections of the chains 15 and 16. This movement not only agitates the bulbs in the hopper, but carries some of them along the chains, up to the top of the sprocket wheels 18, into the narrowing discharge portion 67, and finally on to the gravity track formed by the rods 71, 72 and 73, where because of the weight distribution previously mentioned, the neck or cullet portions 14 of the bulbs 12 drop down between the rods 71 and 73, the closed or larger portions 13 being supported therebetween. The bulbs thus stand upright on the track and continue to feed to the lower portion thereof until they approach a position adjacent the top end of the rod 72, whereupon excess bulbs instead of backing up along the rod 71, discharge into the chute 74 and are returned to the hopper 11 by gravity.

If any bulbs are caught sideways, as viewed in Figure 4, they are lifted by the ramps 57 and 58 and prevented from advancing. If any bulbs start to go up along the conveyor in other than the prone position, illustrated in Figure 3, they are knocked down by one of the swinging gates 59 and 61. The end bulb on the rod track, that is the one encircled by the curved portion 76 of the rod 73, is in the exact position desired for engagement by the suction cup 78 which is swung by the arm 79 to and from position for loading on a sealing machine.

From the foregoing disclosure, it will be seen that we have provided improved means for placing bulbs in upright positions and at the exact location desired for transfer to a sealing machine. Although a preferred embodiment has been described, it will be understood that modifications may be made by those skilled in the art.

We claim:

1. An automatic conveyor for orienting the axes of and feeding open flared-neck lamp bulbs, in which the maximum bulb diameter is greater than the maximum neck diameter, to a gravity track on which they stand upright, comprising a sheet metal hopper, an inclined side wall of which is formed with a slit, frame members with rigidifying slotted flanges depending on opposite sides of said slit, a pair of sprocket wheels, continuous sprocket chains passing over said wheels and with parts of their upper sections underlying said slit, a channel member closing said slit and supporting said upper chain sections, rails secured to the upper surface of the web of said channel member for guiding said chains, the flanges of said channel member depending between said slotted flanges, studs extending outwardly from said channel member flanges and received in said slots, nuts on said studs holding said channel member in adjusted position with respect to said wall, lugs carried by said chains and extending through said slit for engaging bulbs in said hopper, the lugs on one chain being spaced from those on the other a distance greater than the bulb neck diameter but less than the maximum bulb diameter, so that they serve to carry said bulbs therewith, certain of said lugs being extended to a greater height than others so as to agitate the bulbs in said hopper, means for removing bulbs which lie crossways of said chains comprising ramps, one on either side of said chains, to engage the ends of such bulbs and raise them from said lugs, swingable gates disposed above and transverse of said chains so as to sweep bulbs therefrom which lie other than flat thereon, gravity-feed rails, spaced to allow the bulb necks to drop therebetween and catch said bulbs adjacent their portions of maximum diameter, positioned to receive bulbs discharged from the upper ends of said chains and deliver them closed ends up to a position where they may be picked up and transported to a sealing machine, one of said rails having an interruption intermediate its ends so that when the lower rail portions are filled with bulbs, another bulb when stopped will drop through said interruption, the higher rail section of said interrupted rail being inclined less than the corresponding portion of the other rail so as to assist a bulb in motion to jump across the interruption to the lower section of the interrupted rail, the upper end portion of said section for the same purpose being curved downward, a chute beneath said curved upper end portion for directing such overflow bulbs by gravity back to the hopper, and power means for driving said wheels to cause the chains to carry bulbs out of the hopper and deliver them to said gravity-feed rails.

2. An automatic conveyor for orienting the axes of and feeding open flared-neck bulbs, in which the maximum bulb diameter is greater than the maximum neck diameter, to a gravity track on which they stand upright, comprising a sheet metal hopper, an inclined side wall of which is formed with a slit, frame members with rigidifying flanges depending on opposite sides of said slit, a pair of sprocket wheels, continuous sprocket chains passing over said wheels and with parts of their upper sections underlying said slit, means secured to said flanges for supporting the upper portions of said chains, means carried by said chains for engaging bulbs in said hopper, the means on one chain being spaced from those of the other a distance greater than the bulb neck diameter, but less than the maximum bulb diameter, so that they serve to carry said bulbs therewith to the top of said cabins, and gravity feed rails spaced to allow the bulb necks to drop therebetween and catch said bulbs adjacent their portions of maximum diameter so as to hold them upright, positoned to receive bulbs discharged from the upper ends of said chains and deliver them closed ends up to a position where they may be picked up and transported to a sealing machine.

3. An automatic conveyor for orienting the axes of and feeding open flared-neck lamp bulbs, in which the maximum bulb diameter is greater than the maximum neck diameter, to a gravity track on which they stand upright, comprising a sheet metal hopper, an inclined side wall of which is formed with a slit, frame members with regidifying slotted flanges depending on opposite sides of said slit, a pair of sprocket wheels, continuous sprocket chains passing over said wheels and with parts of their upper sections underlying said slit, means secured to said hopper for supporting the upper sections of said chains, lugs carried by said chains and extending through said slit for engaging bulbs in said hopper, the lugs on one chain being spaced from those in the other a distance greater than the bulb neck diameter but less than the maximum bulb diameter, so that they serve to carry said bulbs therewith, certain of said lugs being extended to a greater height than others so as to agitate the bulbs in said hopper, and gravity-feed rails spaced to allow the bulb necks to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine.

4. An automatic conveyor for orienting the axes of and feeding open flared-neck lamp bulbs, in which the maximum bulb diameter is greater than the maximum neck diameter, to a gravity track on which they stand upright, comprising a hopper, an inclined wall of which is formed with a slit lying in a vertical plane, frame members with rigidifying slotted flanges depending on opposite sides of said slit, a pair of sprocket wheels, continuous chains passing over said wheels and with parts of their upper sections underlying said slit, means secured to said flanges for supporting the upper portions of said chains, means carried by said chains for engaging bulbs in said hopper, the means on one chain being spaced from those on the other a distance greater than the bulb neck diameter but less than the maximum bulb diameter, so that they serve to carry said bulbs therewith to the top of said chains, means for removing bulbs which lie crosswise of said chains comprising ramps, one on either side of said chains, to engage the ends of such bulbs and raise them from said bulb-engaging means, and gravity feed rails spaced to allow the bulb necks to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine.

5. An automatic conveyor for orienting the axes of and feeding open flared-neck bulbs, in which the maximum bulb diameter is greater than the maximum neck diameter, to a gravity track on which they stand upright, comprising a hopper, an inclined wall of which is formed with a slit, frame members depending on opposite sides of said slit, a pair of sprocket wheels, continuous sprocket chains passing over said wheels and with parts of their upper sections underlying said slit, means secured to said frame members for supporting the upper portions of said chains, lugs carried by said chains and engaging bulbs in said hopper, the lugs on one chain being spaced from those on the other a distance greater than the bulb neck diameter but less than the maximum bulb diameter, so that they serve to carry said bulbs therewith, swingable gates disposed above and transverse to said chains so as to sweep bulbs therefrom which lie other than flat thereon, and gravity feed rails spaced to allow the bulb necks to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine.

6. An automatic conveyor for orienting the axes of and feeding open flared-neck bulbs, in which the maximum bulb diameter is greater than the maximum neck diameter, to a gravity track, comprising a hopper formed with a slit, sprocket wheels, continuous sprocket chains passing over said wheels with parts of their upper sections underlying said slit, means secured to said hopper for supporting the upper portions of said chains, means carried by said chains for engaging bulbs in said hopper, and gravity feed rails spaced to allow the bulb neck to drop therebetween and engage said bulbs adjacent their portions of maximum diameter so as to hold them upright, positioned to receive bulbs discharged from the upper ends of said chains and deliver them closed ends up to a position where they may be picked up and transported to a sealing machine, one of said rails having an interruption intermediate its ends so that when the lower rail portions are filled with bulbs, another bulb when stopped will drop through said interruption and avoid rail congestion thereabove.

7. An automatic conveyor for orienting the axes of and feeding open flared-neck bulbs, in which the maximum bulb diameter is greater than the maximum neck diameter, to a gravity track, comprising a hopper formed with a slit, sprocket wheels, continuous sprocket chains passing over said wheels with parts of their upper sections underlying said slit, means secured to said hopper for supporting the upper portions of said chains, means carried by said chains for engaging bulbs in said hopper, and gravity feed rails spaced to allow the bulb neck to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine, one of said rails having an interruption intermediate its ends so that when the lower rail portions are filled with bulbs another bulb when stopped will drop through said interruption and avoid rail congestion thereabove, the higher rail section of said interrupted rail being inclined less than the corresponding portion of the other rail, so as to assist a bulb in motion to jump across the interruption to the lower section of the interrupted rail.

8. An automatic conveyor for orienting the axes of and feeding open flared-neck bulbs, in which the maximum bulb diameter is greater than the maximum neck diameter, to a gravity track on which they stand upright, comprising a sheet metal hopper, an inclined side wall of which is formed with a slit, frame members with rigidifying flanges depending on opposite sides of said slit, a pair of sprocket wheels, continuous sprocket chains passing over said wheels and with parts of their upper sections underlying said slit, means secured to said flanges for supporting the upper portions of said chains, means carried by said chains for engaging bulbs in said hopper, the means on one chain being spaced from those of the other a distance greater than the bulb neck diameter, but less than the maximum bulb diameter, so that they serve to carry said bulbs therewith to the top of said chains, gravity feed rails spaced to allow the bulb neck to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine, one of said rails having an interruption intermediate its ends so that when the lower rail portions are filled with bulbs, another bulb when stopped will drop through said interruption, the higher rail section of said interrupted rail being inclined less than the corresponding portion of the other rail, so as to assist a bulb in motion to jump across the interruption to the lower section of the interrupted rail, and a chute beneath the upper end portion of the lower section of the interrupted rail for directing such overflow bulbs by gravity back to the hopper.

9. An automatic conveyor for orienting the axes of and feeding open flared-neck lamp bulbs, in which the maximum bulb diameter is greater than the maximum neck diameter, to a gravity track on which they stand upright, comprising a sheet metal hopper, an inclined side wall of which is formed with a slit, frame members with rigidifying slotted flanges depending on opposite sides of said slit, a pair of sprocket wheels, continuous sprocket chains passing over said wheels and with parts of their upper sections underlying said slit, a channel member closing said slit and supporting said upper chain sections, rails secured to the upper surface of the web of said channel member for guiding said chains, the flanges of said channel member depending between said slotted flanges, studs extending outwardly from said channel member flanges and received in said slots, nuts on said studs holding said channel member in adjusted position with respect to said wall, means carried by said chains for engaging bulbs in said hopper, the means on one chain being spaced from those on the other a distance greater than the bulb neck diameter but less than the maximum bulb diameter so they serve to carry said bulb therewith to the tops of said chains, and gravity feed rails spaced to allow the bulb necks to drop therebetween and catch said bulbs adjacent their portions of maximum diameter so as to hold them upright, positioned to receive bulbs discharged from the upper ends of said chains and deliver them closed ends up to a position where they may be picked up and transported to a sealing machine.

10. An automatic conveyor for orienting the axes of and feeding open flared-neck bulbs, in which the maximum bulb diameter is greater than the maximum neck diameter, to a gravity track on which they stand upright, comprising a sheet metal hopper, an inclined side wall of which is formed with a slit, frame members with rigidifying flanges depending on opposite sides of said slit, a pair of sprocket wheels, continuous sprocket chains passing over said wheels and with parts of their upper sections underlying said slit, means secured to said flanges for supporting the upper portions of said chains, and means carried by said chains for engaging bulbs in said hopper, the means on one chain being spaced from those of the other a distance greater than the bulb neck diameter, but less than the maximum bulb diameter, so that they serve to carry said bulbs therewith, while alined in the direction of travel, to the top of said chains.

JOSEPH J. KIRBY.
MICHAEL E. McGOWAN.

References Cited in the file of this patent

UNITED STATES PATENTS

| Number | Name | Date |
|---|---|---|
| 1,311,590 | Bingham | July 29, 1919 |
| 2,609,912 | Engel | Sept. 9, 1952 |